(12) United States Patent
Zhang et al.

(10) Patent No.: US 7,477,688 B1
(45) Date of Patent: Jan. 13, 2009

(54) METHODS FOR EFFICIENT BANDWIDTH SCALING OF COMPRESSED VIDEO DATA

(75) Inventors: Ji Zhang, San Jose, CA (US); Yi Tong Tse, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 686 days.

(21) Appl. No.: 09/766,020

(22) Filed: Jan. 18, 2001

Related U.S. Application Data

(60) Provisional application No. 60/178,123, filed on Jan. 26, 2000.

(51) Int. Cl.
*H04B 1/66* (2006.01)

(52) U.S. Cl. ............ 375/240; 375/240.03; 375/240.25; 375/240.26; 375/240.12; 382/251; 382/235; 382/233; 382/238

(58) Field of Classification Search ............ 375/240.03, 375/240.02, 240.15, 240.12, 240.16, 240.24, 375/240.25, 240.26, 240; 348/395, 396, 348/400; 382/235, 251, 233, 238
See application file for complete search history.

(56) References Cited

U.S. PATENT DOCUMENTS

| | | | |
|---|---|---|---|
| 5,493,456 A | | 2/1996 | Augenbraun et al. |
| 5,570,197 A | | 10/1996 | Boon |
| 5,617,142 A | * | 4/1997 | Hamilton ............... 375/240.03 |
| 5,623,312 A | * | 4/1997 | Yan et al. ............... 375/240.16 |
| 5,687,095 A | * | 11/1997 | Haskell et al. ........... 348/386.1 |
| 5,751,701 A | | 5/1998 | Langberg et al. |
| 5,754,235 A | | 5/1998 | Urano et al. |
| 5,812,786 A | | 9/1998 | Seazhotlz et al. |
| 6,026,097 A | | 2/2000 | Voois et al. |
| 6,181,711 B1 | | 1/2001 | Zhang et al. |
| 6,208,688 B1 | * | 3/2001 | Seo et al. ............... 375/240.03 |

OTHER PUBLICATIONS

Information Technology—Generic Coding of Moving Pictures and Associated Audio, ISO/IEC 1-13818-1, Nov. 13, 1994.
"Network and Customer Installation Interfaces—Asymmetric Digital Subscriber Line (ADSL) Metallic Interface," American National Standards Institute, ANSI T1.413-1995.
The ATM Forum Technical Committee User-Network Interface Specification, Version 3.1 (UNI 3.1), Aug. 18, 1995.

* cited by examiner

*Primary Examiner*—Shawn An
(74) *Attorney, Agent, or Firm*—Weaver Austin Villeneuve & Sampson LLP

(57) ABSTRACT

The present invention relates to systems and methods for efficient bit rate alteration of a bitstream to match an available channel capacity. The efficient bit rate alteration includes selective re-quantization of the compressed bitstream. Selective re-quantization according to the present invention applies multiple re-quantization schemes to different portions of a bitstream. In one embodiment, the multiple re-quantization schemes each have a different computational load. By selectively choosing which type of re-quantization is performed on each portion, efficient bandwidth scaling and data transmission may be achieved both when computational capacity is limited and when video data integrity is important.

19 Claims, 10 Drawing Sheets

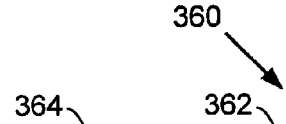

| Combination/ Ranking | More demanding Re-quantization (e.g., process flow 120) | Less demanding Re-quantization (e.g., process flow 100) |
|---|---|---|
| 1 | all frames | none |
| 2 | all I, P, and B luma frames | B chroma frames |
| 3 | all I and P frames | all B frames |
| 4 | most I and P luma and chroma frames | last P luma and chroma frame in GOP, all B frames |
| 5 | I frames, most P luma frames | last P luma frame in GOP, all B frames |
| 6 | none | all frames |
| 7 | none | all I chroma and luma frames |
| 8 | none | just I chroma frames |
| 9 | none | none |

Figure 5D

METHODS FOR EFFICIENT BANDWIDTH SCALING OF COMPRESSED VIDEO DATA

CROSS-REFERENCE TO RELATED APPLICATION

This application claims priority under 35 U.S.C. §119(e) from co-pending U.S. Provisional Patent Application No. 60/178,123 filed Jan. 26, 2000, naming Ji Zhang et al. as inventors, and titled "Methods for Efficient Bandwidth Scaling of Compressed Video Signals", which is incorporated by reference herein for all purposes. This application cross references co-pending U.S. patent application entitled "A System and Method for Transporting Compressed Video and Data Bitstream Over a Communication Channel" by Ji Zhang et al., filed on Oct. 10, 1997 (U.S. application Ser. No. 08/947,480), which is incorporated by reference herein.

BACKGROUND OF THE INVENTION

The present invention relates generally to systems and methods for transmitting data. More specifically, the present invention relates to systems and methods for transmitting compressed digital video data over communication channels at bit rates that comply with the available bandwidth of the channels. In particular, the present invention relates to systems and methods for adapting the bit rate of compressed digital video data by flexible re-quantization.

Transmission of video and voice over digital networks is increasing in demand. Exemplary digital networks include broadband IP networks, ATM networks, DWDM (Dense Wave Division Multiplexing) networks, wireless networks and local last-mile access networks such as DSL networks, cable networks and terrestrial broadcast networks. These networks have limited transmission capacities. Often, there is a need to scale a transmission bitstream including the video data in order to fit within the available bandwidth of a network connection, or channel.

For the purposes of the present application a channel is defined broadly as a connection facility to convey digital information from one point to another. A channel includes some or all of the following elements: 1) physical devices that generate and receive the data (e.g., a modulator/demodulator); 2) a medium that carries the data; 3) mathematical schemes used to encode and decode the data; 4) proper communication protocols used to establish, maintain and manage the connection created by the channel; and 5) storage systems used to store the data such as magnetic tapes and optical disks. The concept of a channel includes but is not limited to a physical channel and also includes logical connections established on top of different network protocols, such as xDSL, ATM, IP, wireless, HFC, coaxial cable, Ethernet, Token Ring, etc.

The channel is used to transport a bitstream, or a continuous sequence of binary bits used to digitally represent compressed video, audio or data. The bit rate is the number of bits per second that the channel is able to transport. The bit error rate is the statistical ratio between the number of bits in error due to transmission and the total number of bits transmitted. The channel capacity is the maximum bit rate at which a given channel can convey digital information with a bit error rate no more than a given value.

Since transmission of video image sequence data with existing communication channels is often excessive in terms of bandwidth requirement, compression is an approach that has been used to make digital video data more transportable. Digital video compression schemes allow digitized video data to be represented digitally in a much more efficient manner. Compression of video data makes it practical to transmit the compressed signal using channels at a fraction of the bandwidth required to transmit the original signal without compression.

International standards have been created on video compression schemes. These include MPEG-1, MPEG-2, MPEG-4, H.261, H.262, H.263, H.263+, etc. These standardized compression schemes rely on several algorithm schemes such as motion compensated transform coding (for example, DCT transforms or wavelet/sub-band transforms), quantization of the transform coefficients, and variable length coding (VLC). The motion compensated encoding removes the temporally redundant information in video sequences. The transform coding enables orthogonal spatial frequency representation of spatial domain video data. Quantization of the transformed coefficients reduces the number of levels required to represent a given digitized video. The other factor contributing to the compression is the use of variable length coding (VLC) so that most frequently used symbols are represented by the shortest code word. In general, the number of bits used to represent a given image determines the quality of the decoded picture. The more bits used to represent a given image, the better the image quality. The system that is used to compress digitized video sequence using the above-described schemes is called an encoder or encoding apparatus.

Commonly, transmission of video data is intended for real-time playback. This implies that all of the information required to represent a digital picture must be delivered to the destination in time for decoding and display in a timely manner. The channel must be capable of making such a delivery. However, a channel imposes a bit rate constraint for data being sent through the channel. This bit rate constraint often falls below the bit rate required to transport the compressed video bitstream.

Thus, there is often a need to scale the transmission bandwidth required for the video data in order to fit within the available bandwidth of a network connection, or channel. However, compression introduces significant complexity to manipulating the bitstream. The compressed video bitstreams, at any given bit rate, cannot be altered to a different bit rate without at least partial decoding and re-encoding. In addition, the number of bits required to represent digital video pictures varies from picture to picture. The coded pictures are sensitive to this variation and bit rate alteration of compressed video data must be as well.

There have been several proposed methods for performing bandwidth scaling of compressed video bitstreams. These bandwidth-scaling methods differ in computational complexity and video quality. Typically, there is a trade-off between computational complexity and video quality. Common to the methods is that only one scaling, or recoding, technique is used on a bitstream.

Quantization has a direct effect on the compressed bit usage and decoded video quality. For many compressed video bitstream schemes, it is possible to change the bit rate of a bitstream by changing the quantization step value. This approach is called re-quantization. Currently, real-time re-quantization of compressed video data is performed in one of two ways: basic re-quantization and motion compensated re-quantization.

Basic re-quantization involves partial de-coding and re-encoding of the compressed bitstream. Partial de-coding includes VLC decoding and de-quantization of a compressed bitstream. Re-encoding of the partially decoded bitstream then includes re-quantization and VLC encoding. The data is typically re-quantized to a larger step size, thus reducing the amount of information in the compressed bitstream and the resultant bit rate.

Re-quantization in this manner without motion compensation to a larger step size often results in a larger loss of video information compared to re-quantization scheme with motion estimation. This video information cannot be subsequently recovered. The resulting loss of video quality is reflected as blocky images and inconsistent image texture. To help reduce the video quality loss as a result of basic re-quantization, more complicated re-quantization schemes such as re-quantization with motion compensation are often used.

Motion compensated re-quantization includes a much more complex set of operations. The additional processing includes DCT transforms, motion compensation, and inverse DCT transforms. Motion compensation recoding may include motion vector re-use or motion vector estimation.

When the bit rate reduction range is small, the quality difference between the two re-quantization schemes is largely negligible. However, the video quality difference between the two schemes is much more pronounced when the bit rate reduction range is large. For example, when a 5 Mbps is reduced to 2 Mbps, motion compensation based recoding yields noticeably better video quality than the re-quantization-only recoding. However, if a 5 Mbps is reduced to 4 Mbps, the video quality impact by the two schemes are largely similar. Another major difference between basic re-quantization and motion compensated re-quantization is the additional processing required for motion compensation of image pixel blocks, which is very computationally intensive.

Transmission of real-time video is highly sensitive to delays. A compressed video bitstream, when transmitted under excessive and jittery delays, will cause a real-time decoder buffer to underflow or overflow, causing the decoded video sequence to be jerky, or causing associated audio video data to be out of synchronization. Another consequence of the real-time nature of compressed video decoding is that lost compressed data will not be re-transmitted. For these reasons, the additional computational load and time required for motion compensated re-quantization often limits its usage. Additionally, a higher computational load on the recoding processor implies that the processor must handle a bitstream of a lower bit rate when performing motion compensation based recoding as compared with re-quantization-only based recoding.

Traditionally, only one of the above re-quantization methods is used. Simpler re-quantization schemes may result in additional video quality loss. More complex schemes are often unsuitable or too costly for many transmission applications such as transmission of real time video. Therefore, there is a need for methods of transmitting digital video information over data channels that can match the bit rate to the channel bandwidth, without incurring an undesirable bit error rate or encountering excessive computational load, and also providing the best trade-off between video quality and processor load requirement.

SUMMARY OF THE INVENTION

The present invention overcomes the deficiencies and limitations of the prior art with systems and methods for efficient bit rate alteration of a bitstream to match an available channel capacity. The efficient bit rate alteration includes selective re-quantization of the compressed bitstream. Selective re-quantization according to the present invention applies multiple re-quantization schemes to different portions of a bitstream. In one embodiment, the multiple re-quantization schemes each have a different computational load. By selectively choosing which type of re-quantization is performed on each portion, efficient bandwidth scaling and data transmission may be achieved both when computational capacity is limited and when video data integrity is important.

In one aspect, the present invention relates to a method for converting the bit rate of a compressed bitstream to use an available bandwidth of a channel. The method comprises re-quantizing a first portion of the bitstream containing video data using a first re-quantization scheme. The method also comprises re-quantizing a second portion of the bitstream containing video data using a second re-quantization scheme.

In another aspect, the present invention relates to a method for converting the bit rate of a compressed bitstream to use an available bandwidth of a channel. The method comprises selectively re-quantizing a portion of the bitstream according to one of two re-quantization schemes. The first re-quantization scheme comprises variable length decoding the portion, inverse quantizing the portion, re-quantizing the portion with a different quantization step size and variable length encoding the portion. The second re-quantization scheme comprising motion compensated re-quantization of the portion.

In yet another aspect, the present invention relates to a network device for providing compressed video data onto a network. The network device comprises a re-quantization apparatus that receives a compressed video bitstream having a first bit rate and outputs the compressed video bitstream having a second bit rate. The re-quantization apparatus includes a first portion configured to receive a first portion of the compressed video bitstream and output the first portion after re-quantization by a first re-quantization scheme. The re-quantization apparatus also includes a second portion configured to receive a second portion of the compressed video bitstream and output the second portion after re-quantization by a second re-quantization scheme. The network device also comprises a transmitter configured to transmit the compressed video bitstream having the second bit rate.

In still another aspect, the present invention relates to a system for converting the bit rate of a compressed bitstream to use an available bandwidth of a channel. The system comprising means for re-quantizing a first portion of the bitstream containing video data using a first re-quantization scheme. The system also comprising means for re-quantizing a second portion of the bitstream containing video data using a second re-quantization scheme.

In yet another aspect, the present invention relates to a computer readable medium including instructions for converting the bit rate of a compressed bitstream to use an available bandwidth of a channel. The instructions comprising instructions for re-quantizing a first portion of the bitstream containing video data using a first re-quantization scheme. The instructions also comprising instructions for re-quantizing a second portion of the bitstream containing video data using a second re-quantization scheme.

These and other features and advantages of the present invention will be described in the following description of the invention and associated Figures.

BRIEF DESCRIPTION OF THE DRAWINGS

FIG. 5D illustrates a table that illustrates combinations of the process flows of FIGS. 5B and 5C in accordance with a specific embodiment of the present invention.

DETAILED DESCRIPTION OF THE PREFERRED EMBODIMENTS

Figure 1:
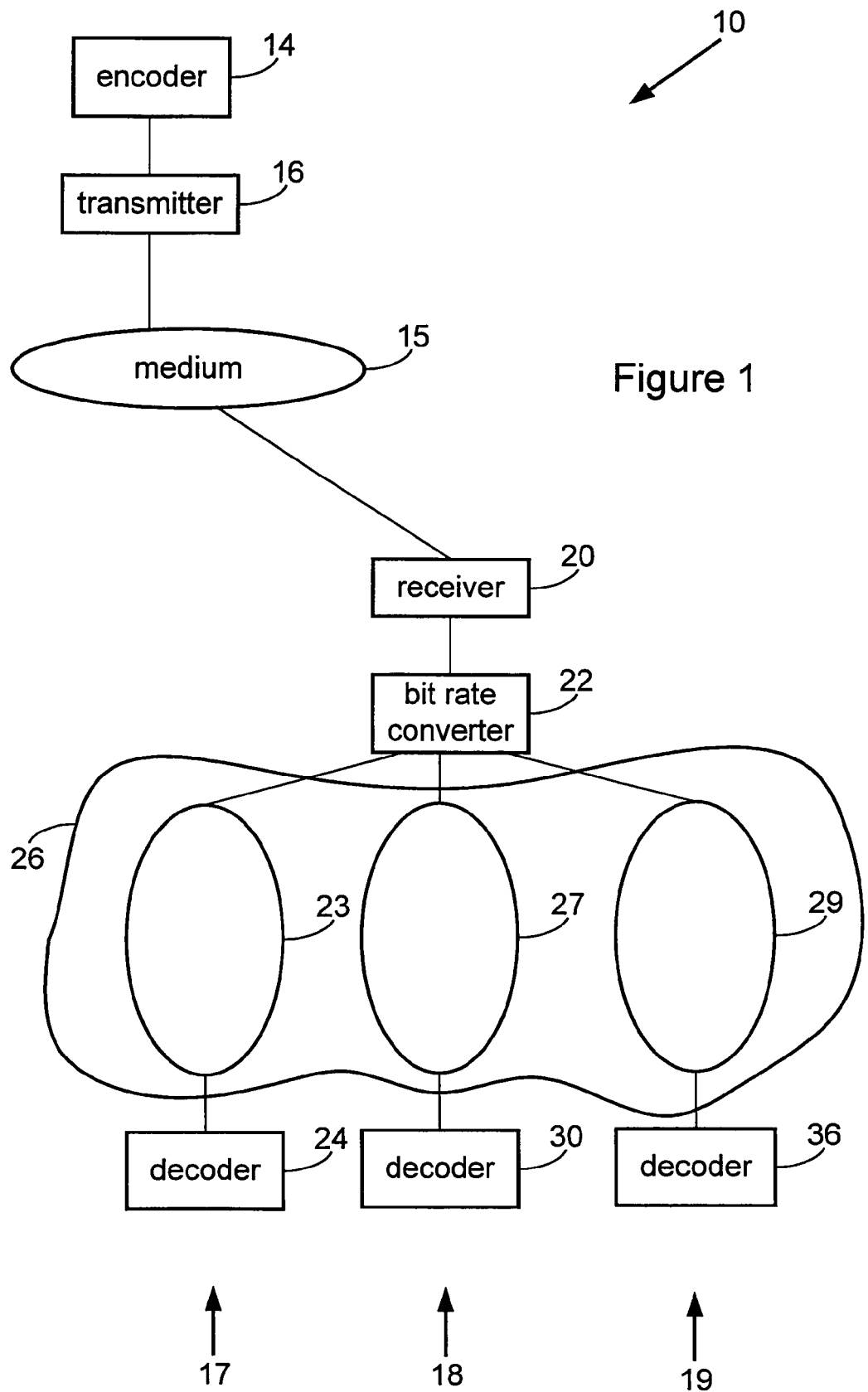
FIG. 1 illustrates a system for transmitting a bitstream having compressed video data at multiple bit rates over multiple channels in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

The present invention relates to methods and apparatus for efficient bandwidth scaling of compressed video data. The present invention includes bit rate alteration of compressed bitstreams such that the resulting bit rate matches an available channel capacity. The bit rate alteration includes selective re-quantization of the compressed bitstream. Selective re-quantization combines multiple re-quantization schemes. In one embodiment, the multiple re-quantization schemes each have a different computational load. A first re-quantization scheme is relatively simple and does not impose a large processing load for re-quantizing video data. Using the first re-quantization scheme may be advantageous when computational load is to be minimized in transmitting the compressed bitstream. A second re-quantization scheme is more computationally demanding and imposes a larger processing load for re-quantizing the video data relative to the first re-quantization scheme. Using the second re-quantization scheme may be advantageous when video data integrity is important for the compressed bitstream. The multiple re-quantization schemes may be selectively applied to different portions of a bitstream. By selectively choosing which type of re-quantization is performed on each portion, efficient bandwidth scaling and data transmission may be achieved both when computational capacity is limited and when video data integrity is important. In one embodiment, the selective re-quantization methods are used to provide lossless transmission of compressed video bitstreams in real-time.

In some multimedia delivery systems, compressed video programs are delivered to numerous digital receiver/decoders via one or more digital transmission channels. In such multicast situations, the same compressed video bitstream, which has a predetermined bit rate R, must be delivered to different end receiver/decoders via different channels. Some of the channels may not have a capacity sufficient to transmit the digital data at the requested bit rate R. In these cases, the present invention applies a selective re-quantization process to the originally compressed bitstream so that the resulting bit rate is no more than the channel capacity. Selective re-quantization results in a reduction of the bit usage required to represent compressed video images. This is due to the fact that when the re-quantization is performed, the quantization step value may be increased for various portions of the bitstream. As a result, the re-quantized data contains less information, which can be compressed with fewer bits.

The invention also relates to a set of network devices. Each of the network devices is adapted to flexibly adapt an incoming compressed bitstream to a compressed bitstream having a bit rate that is appropriate for a channel that the network device transmits onto. For example, if a second channel has a channel capacity R1, which is less than R, the capacity of a first channel, the network device converts an original compressed bitstream to have a bit rate that matches the channel capacity, namely R1. Similarly, if a third channel has a capacity R2, where R2 is less than R but greater than or equal to R1, the network device converts the original compressed bitstream to have a rate that matches the third channel capacity, namely R2. Finally, if a fourth channel has a capacity R3, and R3 is equal to R, then the network device simply passes the original compressed bitstream through the channel.

FIG. 1 illustrates a system 10 for transmitting a bitstream having compressed video data at multiple bit rates over multiple channels 17, 18 and 19 in accordance with one embodiment of the present invention. The channel 17 comprises an encoder 14, a transmitter 16, a receiver 20, a medium 15 coupling the transmitter 16 to the receiver 20, a network device 22 and a decoder 24. The encoder 14 receives an input bitstream and compresses the input bitstream to provide a compressed bitstream. The compressed bitstream is then received by the transmitter 16 and output over the medium 15 at a first bit rate. In a specific embodiment, the medium is a satellite based communication system where the transmitter 16 transmits to a satellite that bounces the signal back to satellite receivers that act as the receiver 20. In another embodiment, the transmitter 16 is any one of a variety of those known in the art for DSL networks or ATM networks.

The compressed bitstream sent over the medium 15 is received by the receiver 20 and input to the network device 22. The network device 22 is a bit rate converter that changes the bit rate of the compressed bitstream according to the available bandwidth on a local network 23 between the network device 22 and the decoder 24. The network device 22 changes the bit rate by selective re-quantization of video data in the bitstream. The network device 22 then sends the re-quantized compressed bitstream to the decoder 24 over the local network 23. In one embodiment, the network device 22 is a headend and the local network 23 corresponds to a geographic service area of a cable network serviced by the headed. The decoder 24 decompresses the compressed bitstream.

The local network 23 is included in a larger network 26 that also includes local networks 27 and 29. Channel 18 comprises the encoder 14, the transmitter 16, the medium 15, the receiver 20, the network device 22, the local network 27 and a decoder 30 for transmitting data from the encoder 14 to the decoder 30. Channel 19 comprises the encoder 14, the transmitter 16, the medium 15, the receiver 20, the network device 22, the local network 29 and a decoder 36 for transmitting data from the encoder 14 to the decoder 36. Each of the local networks 23, 27, and 29 has a different available bandwidth. The available bandwidth determines the maximum bit rate that may be used between the network device 22 and each respective decoders 24, 30 and 36. By way of example, the local network 23 has an available bandwidth that allows a bit rate of 2.5 million bits per second (Mbps), the local network 27 has an available bandwidth that allows a bit rate of 1.5 Mbps, and the local network 29 has an available bandwidth that allows a bit rate of 2.0 Mbps. The present invention allows the compressed video stream produced by the encoder 14 to be sent across any of the channels 17, 18 and 19 to the decoders 24, 30 and 36.

The network device 22 may alter the modified compressed bitstream provided by the encoder 14 to fit the available bandwidth provided by the local networks 23, 27 and 29. The network device 22 may alter the modified compressed bitstream by selectively re-quantizing video data in different portions of the incoming compressed bitstream. It does so using multiple re-quantization schemes and in a timely manner that does not sacrifice real-time transmission of the video data. By way of example, the encoder 14 produces a compressed bitstream that requires a bit rate of 3.0 Mbps. The local network 23 has an available bandwidth that allows a bit rate of 2.5 million bits per second (Mbps) and the network device 22 performs selective re-quantization using multiple re-quantization schemes to change the bit rate of the compressed bitstream to 2 Mbps. The local network 27 has an available bandwidth that allows a bit rate of 1.5 Mbps and the network device 22 performs applies a simplified re-quantization scheme on some portions of the bitstream and a computationally more expensive re-quantization scheme on other portions of the bitstream to change the bit rate to fit the available bandwidth of the local network 27. The local network 29 has an available bandwidth that allows a bit rate of 2.0 Mbps and the network device 22 performs applies selective re-quantization using multiple re-quantization schemes to change the bit rate of the compressed bitstream to 2.0 Mbps. In some cases, the available bandwidth on the channels 17, 18 and 19 may vary over time and the network device 22 adapts accordingly. The network device 22 also provides bandwidth sharing between the output compressed bitstream and other video and data bitstreams.

The system 10 is suitable for real-time bit rate alteration and real-time decoded playback at a different location. The decoded real-time playback may be done according to the NTSC standard and PAL standard, for example. While the present invention will now be described in the context of cable networks, IP networks, ATM networks, Digital Subscriber Line networks (DSL) such as xDSL, ADSL, HDSL, VDSL, and SDSL, those skilled in the art will realize that the present invention is applicable to other types of communication channels.

Asymmetric Digital Subscriber Loop, or ADSL, is a physical line code modulation scheme for transmitting digital bitstream over a single pair of plain old telephone system (POTS) grade twisted copper wires, that are usually noisy and are subject to outside interference. Several schemes have been developed to achieve high channel capacity of the twisted copper wires. xDSL systems provide simplex or full duplex raw bit pipes between the Central Office (CO) and the remote site receivers. The material content and the format of the bitstream or the protocols used by the connections being established by the bit pipe is immaterial to the xDSL system. In ADSL, the downstream link, from central office (CO) to remote site, typically has a higher bandwidth than the upstream direction. Downstream channel capacity is typically up to 8 Mbps while the upstream channel capacity is up to about 1 Mbps. The actual channel capacity may also depend on the noise level and the distance between the transmitter and the receiver.

Because broadcast video quality can be achieved with compressed video, such as MPEG-2, at 3-6 Mbps, ADSL provides a useful delivery scheme for compressed digital video and other high speed data connecting COs with remote sites such as consumer subscribers or business establishments. However, because of the variation in physical line conditions mentioned above, ADSL transmission schemes do not specify channel capacity in either direction. Alternatively, the channel capacity is determined at connection set up time via channel initialization and training by the transceivers at the CO location and at the remote locations. The initialization and training process determines the proper coding configuration best matched to the current channel condition in order to achieve the maximum channel capacity. During the connection, due to a change in line condition or due to loss of data, the transceivers may also re-initialize and retrain to settle on a new coding configuration.

Figure 2A:
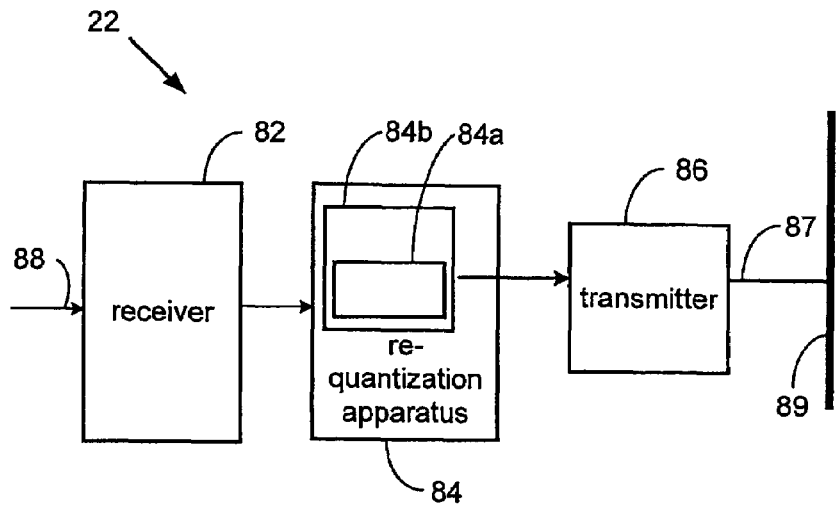
FIG. 2A is a high level block diagram of the network device of FIG. 1 for converting the bit rate of a compressed bitstream using multiple quantization schemes in accordance with one embodiment of the present invention.

FIG. 2A is a high level block diagram of the network device 22 for converting the bit rate of a compressed bitstream using selective re-quantization in accordance with one embodiment of the present invention. The network device 22 adjusts the bit rate of an input compressed bitstream 88 including video data to match the bandwidth capacity of a channel that it transmits onto. The output compressed bitstream of the network device 22 is either at the original bit rate or at a lower bit rate. The network device 22 comprises a receiver 82, a re-quantization apparatus 84 and a transmitter 86. The receiver 82 receives the bitstream 88 from a network channel. An output of the receiver 82 is coupled to the re-quantization apparatus 84.

The re-quantization apparatus 84 converts the compressed video stream 88 to an output bitstream 87 using multiple re-quantization schemes. The re-quantization apparatus 84 may be a single structure or multiple structures. In one embodiment, the re-quantization apparatus 84 is implemented in software and the software is capable of flexibly applying multiple re-quantization schemes. A first portion 84a of the re-quantization apparatus 84 re-quantizes a first portion of the compressed bitstream 88 using a first re-quantization scheme. A second portion 84b of the re-quantization apparatus 84 re-quantizes a second portion of the compressed bitstream 88 using a second re-quantization scheme. In one embodiment, the second re-quantization scheme is computationally more demanding than the first re-quantization scheme. In this case, the first portion 84a is included within the second portion 84b. In another embodiment, the re-quantization apparatus 84 consists of separate and discrete hardware portions each dedicated to a single re-quantization scheme.

An output of the re-quantization apparatus 84 is coupled to the input of the transmitter 86. The transmitter 86 transmits the compressed bitstream produced by the re-quantization apparatus 84 onto a channel 89. As illustrated in FIG. 2A, the re-quantization apparatus 84 and the transmitter 86 are separate devices or performed in software separate modules. In another embodiment, the re-quantization apparatus 84 and transmitter 86 are combined in a single device or software module.

The channel 89 may correspond to any one of a number of conventional transmission systems, including but not limited to xDSL, ATM/ADSL, ATM, ISDN links, Ethernets, public data networks, T1, T3, DS-3, OC-3, wireless/terrestrial networks, digital satellites, digital cable networks, etc.

The present invention describes bit rate alteration methods applied onto compressed video bitstreams by performing selective re-quantization. Although the remaining discussion will focus primarily on re-quantization of an MPEG-2 transmission bitstream, the present invention is not limited to re-quantizing a bitstream of MPEG, or any other specific format. In other words, re-quantization in accordance with the present invention may be implemented in any public or proprietary compression format including quantization as a compression step as one skilled in the art will appreciate. Examples of such compression formats include MPEG-1, MPEG-2, MPEG-4, H.261, H.262, H.263, H.263+, Microsoft streaming format, QuickTime, and RealNetworks.

Figure 3:
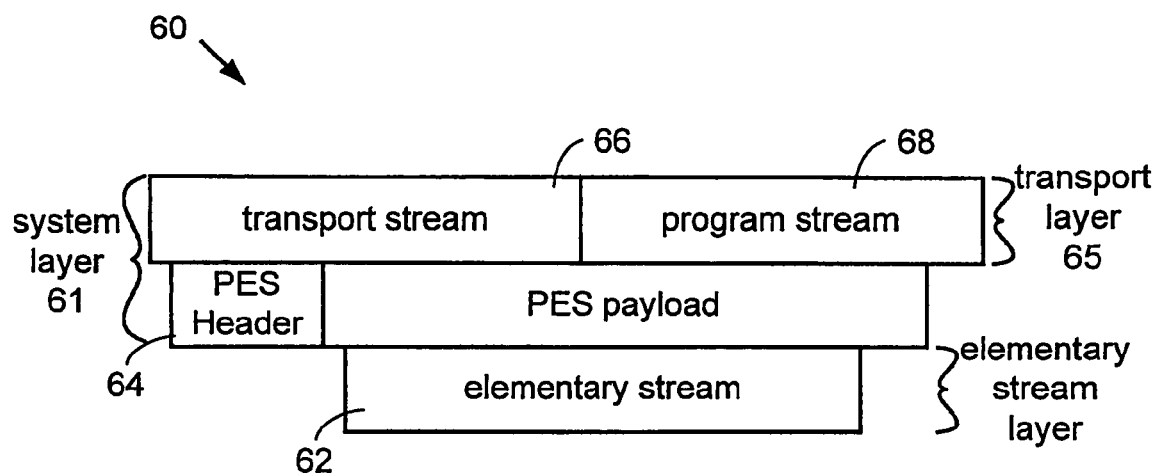
FIG. 3 shows a high level illustration of a transmission bitstream having an MPEG-2 format.

FIG. 3 illustrates a transmission bitstream 60 having an MPEG-2 format in accordance with one embodiment of the present invention. The MPEG-2 compression standard consists of two layers: a system layer 61 an elementary stream layer 62. The system layer 61 comprises two sub layers: a packetized elementary stream (PES) layer 64 and a packet layer 65 above the PES layer 64. The packet layer 65 can be either a transport stream 66 or a program stream 68. For compressed video and audio data, the data follows a hierarchical structure, namely, the elementary stream is contained in the PES payload, and the PES packets are contained in the packet layer payload.

The elementary stream layer 62 typically contains the coded video and audio data. It also defines how compressed video (or audio) data are sampled, motion compensated (for video), transform coded, quantized and represented by different variable length coding (VLC) tables.

The basic structure for a coded video picture data is a block that is an 8 pixel by 8 pixel array. Multiple blocks form a macroblock, which in turn forms part of a slice. A coded picture consists of multiple slices. Multiple coded pictures form a group of pictures. Such hierarchical layering of data structures localizes the most basic processing on the lowest layer, namely blocks and macroblocks. In one embodiment, processing in accordance with the present invention occurs on this lowest level. For example, motion compensation re-quantizing of a precompressed MPEG-2 bitstream is a process that occurs on the elementary stream layer 62.

Each block contains variable length codes (VLC) for DCT coefficients. In the MPEG-2 syntax, the picture data section contains the bulk of the compressed video images. This is where the DCT coefficients are encoded as VLCs. For a typical bitstream, this portion of the data takes somewhere between 70%-90% of the total bit usage of a coded picture, depending on the coded bit rate.

The access unit level information relates to coded pictures and may specify whether a picture is an intra frame (I frame), a predicted frame (P frame), or a bi-directional frame (B frame). An I frame contains full picture information. A P frame is constructed using a past I frame or P frame. A bi-directional frame (B frame) is bi-directionally constructed using both a past and a future I or P frame, which are also called anchor frames.

Referring back to FIG. 3, the next layer is the system layer 61. The system layer 61 is defined to allow an MPEG-2 decoder to correctly decode audio and video data, and present the decoded result to the video screen in time continuous manner. The system layer 61 consists of two sublayers. The first sublayer in the system layer 61 is the PES layer 64. The PES layer 64 defines how the elementary stream layer is encapsulated into variable length packets called PES packets. In addition, the PES layer 64 may include presentation and decoding timestamps for the PES packets, which are used by a decoder to determine the timing to decode and display the video images from the decoding buffers.

The transport layer 65 defines how the PES packets are further packetized into fixed sized transport packets, e.g. packets of 188 bytes to produce a transport stream. Additional timing information and multiplexing information may be added by the transport layer 65. The transport stream 66 is optimized for use in environments where errors are likely such as transmission in a lossy or noisy media. Applications using the transport stream 66 include Direct Broadcast Service (DBS), digital or wireless cable services, broadband transmission systems, etc. The program stream 68 defines how the PES packets are encapsulated into variable sized packets and may also include additional timing in multiplexing information. The program stream 68 is designated for use in relatively error free environments and is suitable for applications that may involve software processing of system information such as interactive multimedia applications. Applications of program stream 68 include Digital Versatile Disks (DVD) and video servers.

Video data can be contained in the elementary stream (ES), which means that no PES, transport or program system layer information is added to the bitstream. The video data can also be contained in the PES stream 64, transport stream 66 or program stream 68. For a given video bitstream, the difference between these different layers lies in the timing information, multiplexing information and other information not directly related to the re-encoding process. In one embodiment, the information required to perform re-encoding is contained in the elementary stream layer. However, the present invention is not limited to bitstreams in the elementary stream layer. In other words, the present invention can be extended to the PES stream, transport stream or program stream as one of skill in the art will appreciate.

The structure of the MPEG standard is well known to one of skill in the art and described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference.

Having briefly discussed an exemplary system for transmitting compressed video data as well the MPEG syntax, the network device 22 of FIG. 1 will be described in accordance with another embodiment of the present invention.

Figure 2B:
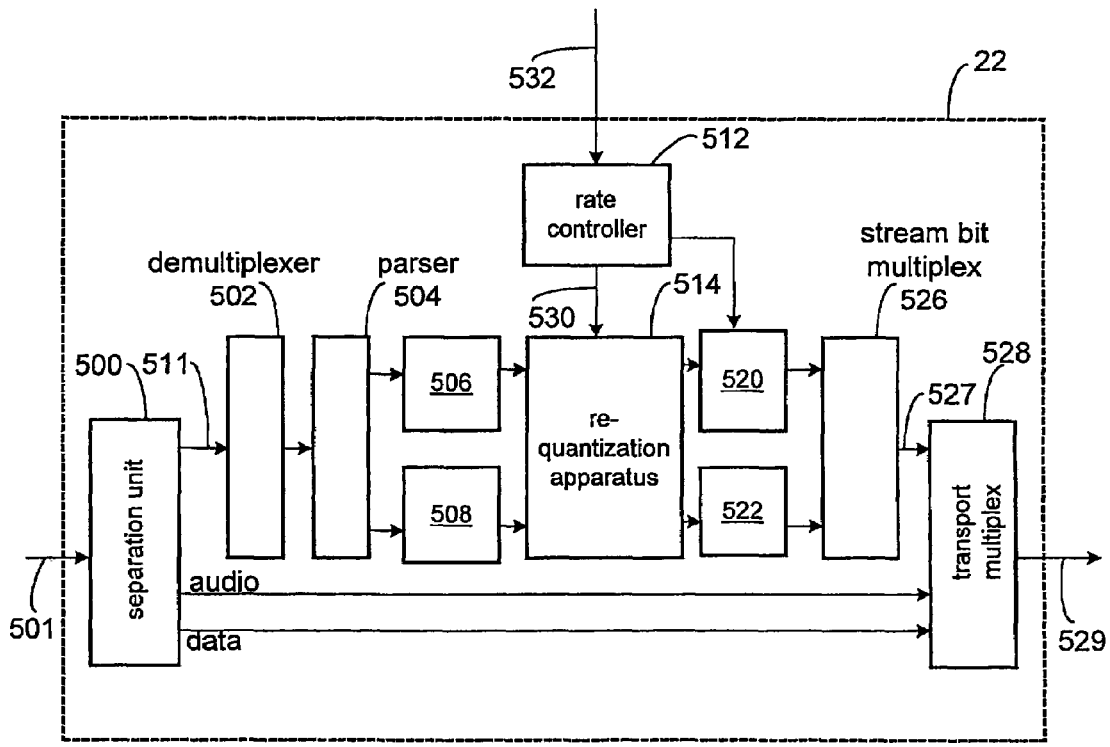
FIG. 2B illustrates the network device of FIG. 1 in accordance with another embodiment of the present invention.

Referring now to FIG. 2B, a second embodiment of a network device 22 of FIG. 1 is illustrated in accordance with another embodiment of the present invention. The network device 22 uses selective re-quantization to alter video data in a compressed bitstream to provide a new compressed bitstream having a new bit rate. For FIG. 2B, the data and bit rate conversion process is intended to remove bits from the modified compressed bitstream so that the new bitstream is still compliant to the given compression syntax, and can be decoded by the receiver, albeit at a possibly lower quality than the originally compressed bitstream. In some cases, the new compressed bitstream may be further multiplexed with other bitstreams to share the same channel capacity.

The second embodiment of the bit rate conversion device 22 is adapted for use on a MPEG-2 transport stream and comprises a separation unit 500, a de-multiplexer 502, an elementary stream parser 504, a DCT VLC decoder 506, a motion vector VLC decoder 508, a rate controller 512, a re-quantization apparatus 514, a DCT VLC encoder 520, a motion vector VLC encoder 522, a bitstream multiplexer 526, and a transport multiplexer 528. While the present invention will now be described as an apparatus composed of units, those skilled in the area will recognize that the present invention encompasses a method, process or software having as steps the actions performed by each unit and described below.

The separation unit 500 has an input and a plurality of outputs. The input of the separation unit 500 is coupled to line 501 to receive an input compressed digital video bitstream. The separation unit 500 de-multiplexes the system layer stream, removing filler packets/frames as appropriate, to obtain a video stream, an audio stream, and a data stream. The video bitstream is provided on a first output coupled to line 511. The audio stream and data stream are output directly to the transport multiplexer 528 which recombines these bitstreams with a rate converted video stream 527.

The de-multiplexer 502 is coupled to receive the video stream from the separation unit 500. The de-multiplexer 502 extracts a video elementary stream payload from the video stream and in turn sends the video elementary stream payload to the elementary stream bit parser 504. The elementary stream bit parser 504 receives the output of the de-multiplexer 502 and divides it into a transform coefficient component and a motion vector component. Each of these components is output to a respective decoder 506 and 508. More specifically, the discrete cosine transform (DCT) variable length coding (VLC) decoder 506 is provided to decompress the transform coefficient component while the motion vector (MV) variable length coding (VLC) decoder 508 is provided to decompress the motion vector component.

The present invention also provides the rate controller 512 to control the bit rate at which the transport multiplexer 528 outputs data. In one embodiment, the rate controller 512 determines the bit usage for each video frame so that the resulting output bitstream maintains a desired bit rate profile. The rate controller 512 is coupled to receive commands that specify the bit rate for the output stream, and therefore, the rate by which the re-quantization apparatus 514 and encoder components 520 and 524 alter the data bitstreams. For example, when the rate controller is used in the context of RADSL, the input to the rate controller 512 is coupled to line 532 which in turn is coupled to receive feedback from an RADSL transmitter or ADSL modem to control the target output bit rate. In such an arrangement, the signal provided on line 532 is a value or rate for the re-quantization apparatus 514 to output data. The rate controller 512 is shown diagrammatically in FIG. 2B as being coupled to the re-quantization apparatus 514 by control signal line 530. While the rate controller 512 has been described as being a discrete device, those skilled in the art will realize that the rate controller 512 could be software that provides a control signal to the re-quantization apparatus 514.

The rate controller 512, and decoders 506 and 508, are coupled to the re-quantization apparatus 514. The re-quantization apparatus 514 is used to modify portions of the bitstream received at line 501. The modification of the these portions comprises flexibly applying multiple re-quantization schemes to change the quantization step size of the video images. In one embodiment, the modification of the encoded bitstream comprises changing the quantization step size on a frame by frame basis. The particular quantization step size used may be determined by the control signal from the rate controller 512. The present invention performs rate control by adjusting the quantization step size of video data in the video stream using multiple re-quantization schemes. In many cases, one re-quantization scheme is used for some frames an another re-quantization scheme for other frames. In a specific embodiment, the present invention also performs rate control by adjusting the resolution of the video data. Resolution alteration of the video data typically requires complete decoding to a raw video image before encoding back into a compressed bitstream and may include additional hardware and software not illustrated in FIG. 2B. For example, frame buffers may be included to store images while motion vectors are generated. The performance of the re-quantization apparatus 514 will be described in further detail with respect to FIGS. 4A-4C.

The outputs of the downconverter 514 are in turn coupled to respectively to the DCT VLC encoder 520 and the motion vector VLC encoder 522. Each of the encoders 520 and 522 code the re-quantized video data back into the compressed format. In one embodiment, the encoder 520 performs DCT, motion residual calculation via motion compensation, variable length coding of all the bits. The outputs of the encoders 520 and 522 are then combined by stream bit multiplexer 526, and then again combined with the audio and data by the transport multiplexer 528. The output of the multiplexer 528 provides a signal 529 that is converted to match the bit rate of a channel that the network device 22 transmits onto. The output compressed bitstream 529 is compliant to the MPEG standard. Although the discussion so far has focused on video data in the transport stream, one of skill in the art will appreciate that the bit rate converter 22 is capable of handling the program stream as well.

Having briefly discussed the MPEG syntax, two exemplary embodiments of the network device 22, selective re-quantization of compressed data in accordance with one aspect of the present invention will now be expanded upon.

Upon receiving a compressed bitstream at a headend or any other suitable network device, the network device applies selective re-quantization and bit rate alteration. In general, the selective re-quantization comprises re-quantizing a first portion of the bitstream containing video data using a first re-quantization scheme and re-quantizing a second portion of the bitstream containing video data using a second re-quantization scheme. In one embodiment, the present invention uses a combination of a computationally varying re-quantization schemes. More specifically, the present invention may selectively apply a computationally less demanding re-quantization scheme and a computationally more demanding re-quantization scheme. The selective re-quantization may then bypass some of the computationally expensive steps in the more demanding re-quantization scheme when advantageous.

In one embodiment, selective re-quantization combines basic re-quantization and a more computationally demanding re-quantization scheme including motion compensation re-encoding. As mentioned before, motion compensated re-quantization is generally more computationally demanding than basic re-quantization. FIGS. 4A-D illustrate exemplary re-quantization schemes suitable for use with the present invention. The re-quantization schemes may take place in the network device 22 of FIG. 1. Processes in accordance with the present invention may include up to several additional steps not described or illustrated here in order not to obscure the present invention. While re-quantization will now be described as a method, those skilled in the area will recognize that the present invention encompasses a system or software having units capable of performing the actions as described below.

Figure 4A:
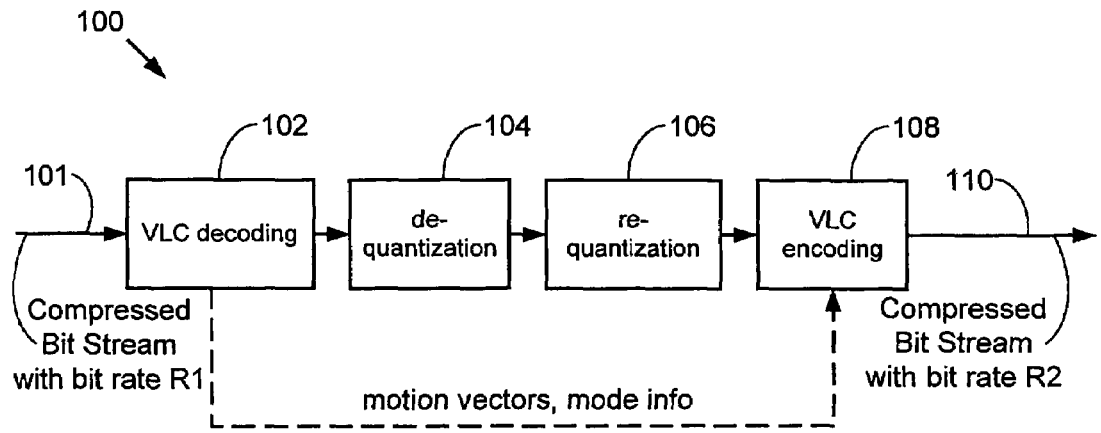
FIG. 4A illustrates an exemplary block diagram of the processing required for a basic re-quantization scheme.

FIG. 4A illustrates a block diagram of the processing required for a basic re-quantization scheme 100. Basic re-quantization 100 begins by receiving a portion of a compressed bitstream having video data (101). The video data is then re-encoded. As the term is used herein, re-encoding refers to the process of performing at least partial decoding and subsequent encoding on a compressed bitstream. Partial decoding of the video data includes VLC decoding 102 and de-quantization 104. Re-encoding then comprises re-quantization 106 and VLC encoding 108. For bit rate reduction of the video data, re-quantization 106 is performed with a larger quantization step value. As one of skill in the art will appreciate, the exact quantization step value will depend on a number of factors such as the channel capacity, bit rate reduction ratio, picture type, original quantization step size, video resolution, general scene activity measures (e.g., a scene cut, fade, dissolves, wipes, rapid motion, panning), etc. The motion vectors and mode info are then encoded back into the compressed domain for transmission by the network device (110).

Figure 4B:
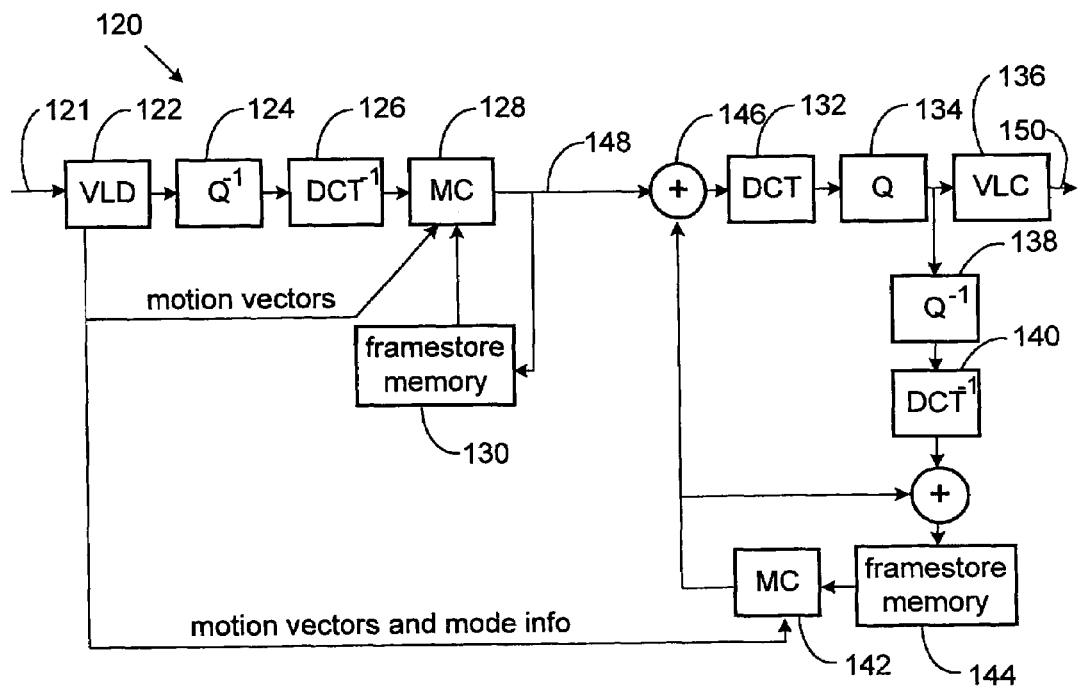
FIG. 4B illustrates an exemplary block diagram of the processing required for motion compensated re-quantization with motion vector re-use.

FIG. 4B illustrates a block diagram of the processing required for re-quantization via one type of motion compensation re-quantization scheme 120 and motion vector re-use. Recoding in this case begins by receiving compressed video data (121). The video data is then decoded comprising variable length decoding 122, de-quantization 124, inverse transform coding 126 and motion compensation 128. Motion compensation 126 includes an iterative process where I, P and B frames are reconstructed using a framestore memory 130. Encoding includes processing the video data with transform coding 132, re-quantization 134, and VLC encoding 136. For bit rate reduction of the video data, re-quantization 134 is performed with a larger quantization step value.

After transform coding 132 and re-quantization 134, each image is decoded comprising de-quantization 138 and inverse transform coding 140 before motion compensation 142 with the motion vectors and mode info provided by VLD 122. Motion compensation 142 includes an iterative process where I, P and B frames are reconstructed using a framestore memory 144. Motion compensation 142 produces a predicted picture that is summed 146 with the next decoded picture 148 and encoded by transform coding 132, re-quantization 134, and VLC encoding 136. This iterative process of motion compensation 142 with motion vector re-use and re-encoding (132, 134 and 136) produces compressed video data 150 having a lower bit rate than received (121). The re-quantized compressed video data 150 may then be combined with other re-quantized compressed video data and transmitted onto a channel. Drift in the reference I and P pictures is represented by the difference between the two framestore memories 130 and 144 due to re-quantization. The motion compensation re-quantization scheme 120 takes into account the drift in generating the video data 150, and hence provides better video quality than scheme 100, particularly when the bit rate reduction ratio is large.

Figure 4C:
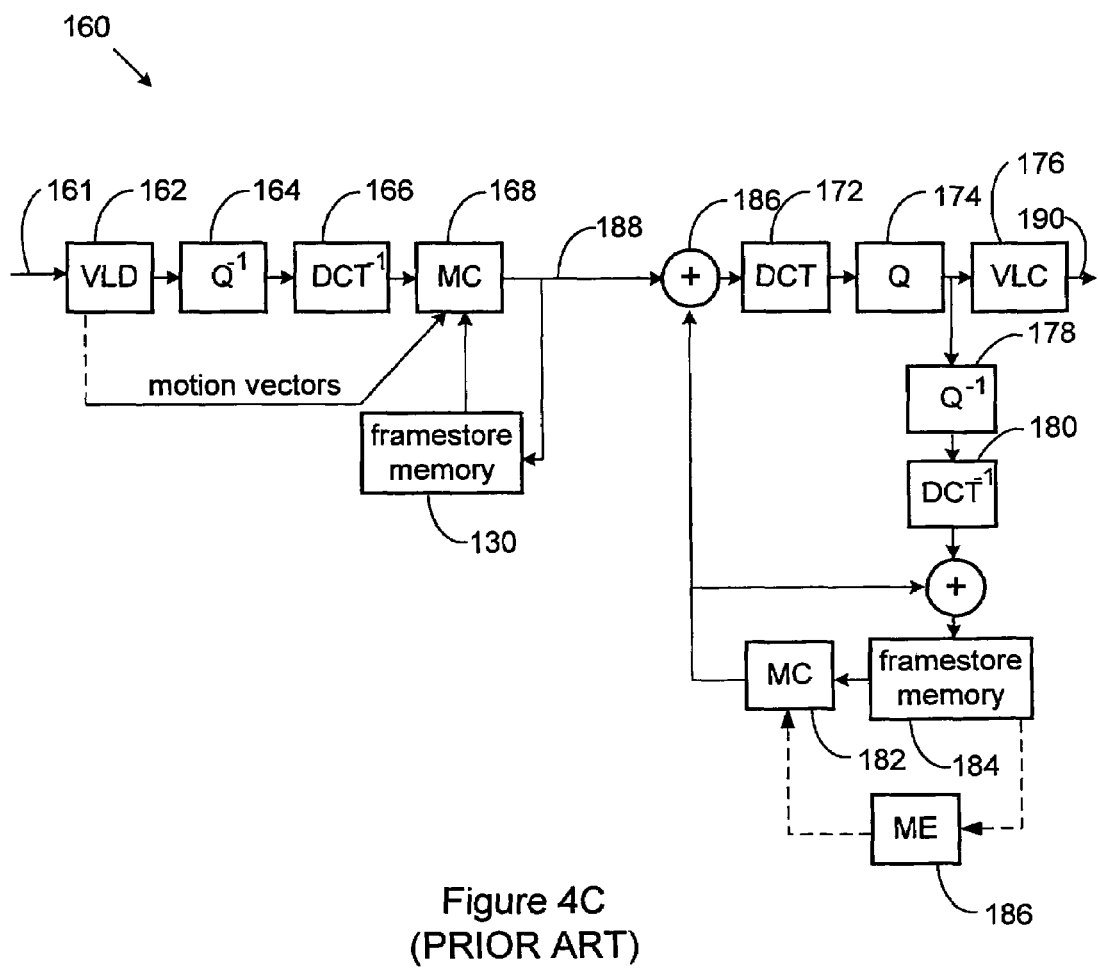
FIG. 4C illustrates an exemplary block diagram of the processing required for motion compensated re-quantization with motion estimation.

FIG. 4C illustrates an exemplary block diagram of the processing required for re-quantization via complete recoding 160. Recoding in this case begins by receiving compressed video data (161). The video data is then decoded comprising variable length decoding 162, de-quantization 164, inverse transform coding 166 and motion compensation 168. Motion compensation 166 includes an iterative process where I, P and B frames are reconstructed using a framestore memory 170. Recoding includes processing the video data with transform coding 172, re-quantization 174, and VLC encoding 176. For bit rate reduction of the video data, re-quantization 174 is performed with a larger quantization step value.

After transform coding 172 and re-quantization 174, each image is decoded comprising de-quantization 178 and inverse transform coding 180 before motion compensation 182 with motion vectors provided by motion estimation 186. Motion estimation 186 is applied to generate motion vectors on a frame by frame basis. Motion compensation 182 includes an iterative process where I, P and B frames are reconstructed using a framestore memory 184. Motion compensation 182 produces a predicted picture that is summed 186 with the next decoded picture 188 and encoded by transform coding 172, re-quantization 174, and VLC encoding 176. This iterative process of motion compensation 182 including generation of motion vectors by motion estimation 186 produces compressed video data 190 having a lower bit rate than received (161). The re-quantized compressed video data 190 may then be combined with other re-quantized compressed video data and transmitted onto a channel. The re-quantization scheme 160 is advantageous if the resolution of the video data is also to be changed, e.g., to further reduce the bit rate.

FIG. 4C represents a complete re-encoding, i.e., decoding followed encoding. In this case, motion estimation is required because motion vectors are not re-used from the input. This approach is generally significantly more computationally complex since motion estimation is much more computationally intensive than the re-quantization only and motion compensation operations. Generally, the benefit of such complete re-encoding is not significant when the bit rate reduction ratio is minor, i.e., not greater than 80%. One benefit of complete re-encoding is that it allows a resolution change of the video data. For example, a full D-1 resolution video, when compressed to, say, 6 Mbps, can be re-encoded into a SIF resolution at, say, 800 Kbps, and still maintain acceptable video quality.

Figure 4D:
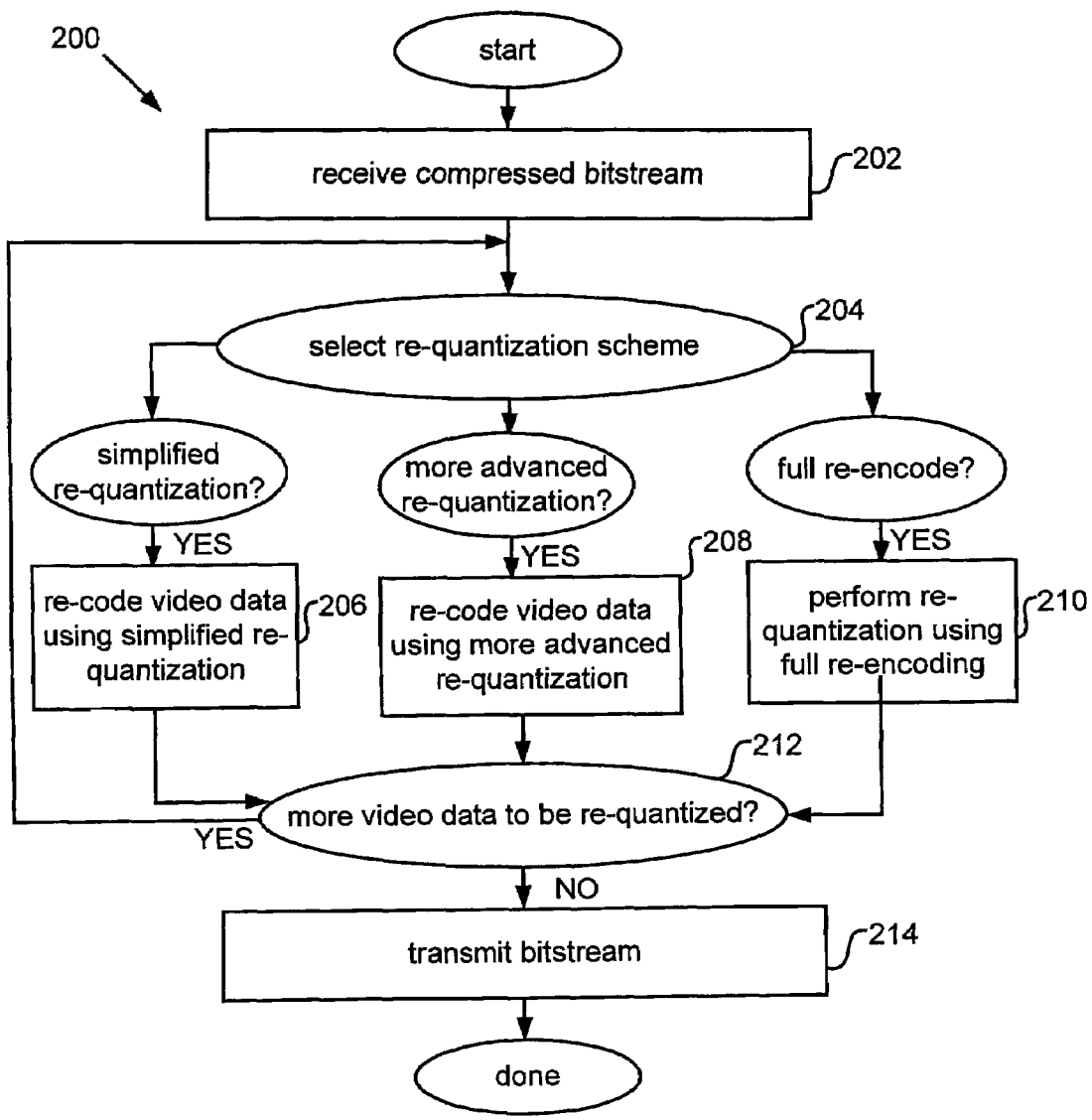
FIG. 4D illustrates a process flow for selective re-quantization in accordance with one embodiment of the present invention.

FIG. 4D illustrates a process flow 200 for selective re-quantization in accordance with one embodiment of the present invention. The process flow 200 begins by receiving a compressed bitstream (202). For each portion of video data in the compressed bitstream, the process flow then determines which of a plurality of re-quantization schemes is to be used (204). The process flow 200 uses three different re-quantization schemes, each having a different computational load. A first re-quantization scheme is relatively simple and does not impose a large processing load for re-quantizing video data (206). The basic re-quantization 100 of FIG. 4A is suitable for use as the first re-quantization scheme. Using the first re-quantization scheme may be advantageous when computational load in processing the compressed bitstream is to be minimized and/or the bit rate reduction ratio is small. A second re-quantization scheme is more computationally demanding and imposes a larger processing load, relative to the first re-quantization scheme, for re-quantizing the video data (208). The re-quantization via motion compensation recoding 120 of FIG. 4B is suitable for use as the second re-quantization scheme. Using the second re-quantization scheme may be advantageous when maintaining quality of the video data is important. A third re-quantization scheme comprises full decoding and encoding (206). The re-quantization via complete recoding 160 of FIG. 4C is suitable for use as the third re-quantization scheme. Using the third re-quantization scheme may be advantageous when the bit rate is to be significantly reduced using resolution conversion (also commonly referred to as downsampling) of the video data. The selection process proceeds for each portion of the compressed bitstream that was received (212). After all of the video data in the compressed bitstream has been re-quantized, the portions may combined and the compressed bitstream may then be transmitted over the channel (214).

In one embodiment, a combination of a re-quantization schemes varying in computation demand is used. Selective re-quantization may then optionally bypass some of the computationally expensive re-quantization schemes for portions of a compressed bitstream. Alternatively, selective re-quantization may then apply a computationally expensive re-quantization scheme for portions of a compressed bitstream where quality is important. In one embodiment, the present invention may implement a computationally more demanding re-quantization scheme on portions of the compressed video bitstream where quality is important. Alternatively, the present invention may implement a computationally less demanding re-quantization scheme on portions of the compressed video bitstream where quality is not as important or when the bit rate reduction ratio is small, resulting in less noticeable quality degradation. For the re-quantization schemes discussed above and implemented in the network device 22, this is advantageous because the network device 22 does not have to perform full motion estimation re-quantization to change the quantization step size of the video data for the entire bitstream, while maintaining video quality. Although the present invention will now be discussed with respect to the exemplary re-quantization schemes described in FIGS. 4A-C, the selective re-quantization methods of the present invention may include any suitable re-quantization scheme as one of skill in the art will appreciate.

In one embodiment, the portions of a compressed bitstream that are selectively re-quantized correspond to individual frames. As mentioned before, an MPEG bitstream comprises I, P and B frames.

Figure 5A:
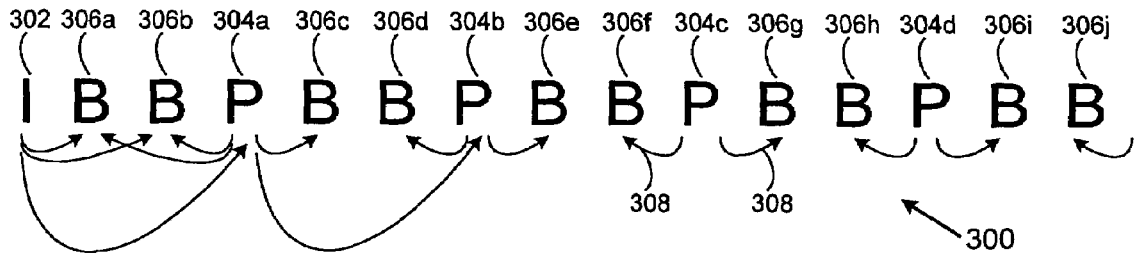
FIG. 5A illustrates an exemplary portion of a compressed bitstream to be re-quantized by the present invention.

FIG. 5A illustrates an exemplary frame sequence 300 included in a compressed bitstream to be re-quantized by the present invention. The sequence 300 corresponds to a group of pictures in an MPEG-2 bitstream. The sequence 300 includes an initial I frame 302, P frames 304a-d and ten B frames 306a-j. The I frame 302 contains full picture information. The P and B frames are constructed from other frames as illustrated by arrows 308. Each P frame 304a-c is constructed using the I frame 302 or a previous P frame 304 a-c, whichever immediately precedes the P frame (e.g., the P frame 304b uses the P frame 304a). The B frames 306a-j are bi-directionally constructed using the nearest past and future reference picture. A reference picture is either an I or a P picture. For example, the B frames 306a and 306b are constructed using the past I frame 302 and future P frame 304a.

Because of the construction relationships of the frames in the sequence 300, errors in one frame may propagate to another. More specifically, re-quantization errors in an I frame may propagate to P and B frames constructed using the I frame. Re-quantization errors in a P frame may propagate to B frames and subsequent P frames produced using the P frame. The re-quantization error may also cumulatively propagate, e.g. from I frame 302 to the P frame 304a to the P frame 304b to the B frame 306e. As a result of this error propagation, re-quantization errors typically have more effect on video quality for P frames than B frames. In addition, re-quantization errors typically have more effect on video quality for I frames than P frames.

In one embodiment, the selective re-quantization methods of the present invention consider the amount of bit rate reduction required and the available computation capacity to process the bitstream. If the amount of bit rate reduction is small, then the basic re-quantization scheme 100 (FIG. 4A) may be used for all coded picture types. If the amount of bit rate reduction is large and there is an abundant amount of computational capacity, then re-quantization via motion compensation recoding 120 of FIG. 4B may be used for all coded picture types. As each frame is rebuilt individually, errors will not propagate to the P and B frames and error propagation is minimized—at the cost of the increased computational load. If the amount of bit rate reduction for the compressed bitstream is significant and computational capacity is limited, a more selective method of re-quantization may be used.

Figure 5B:
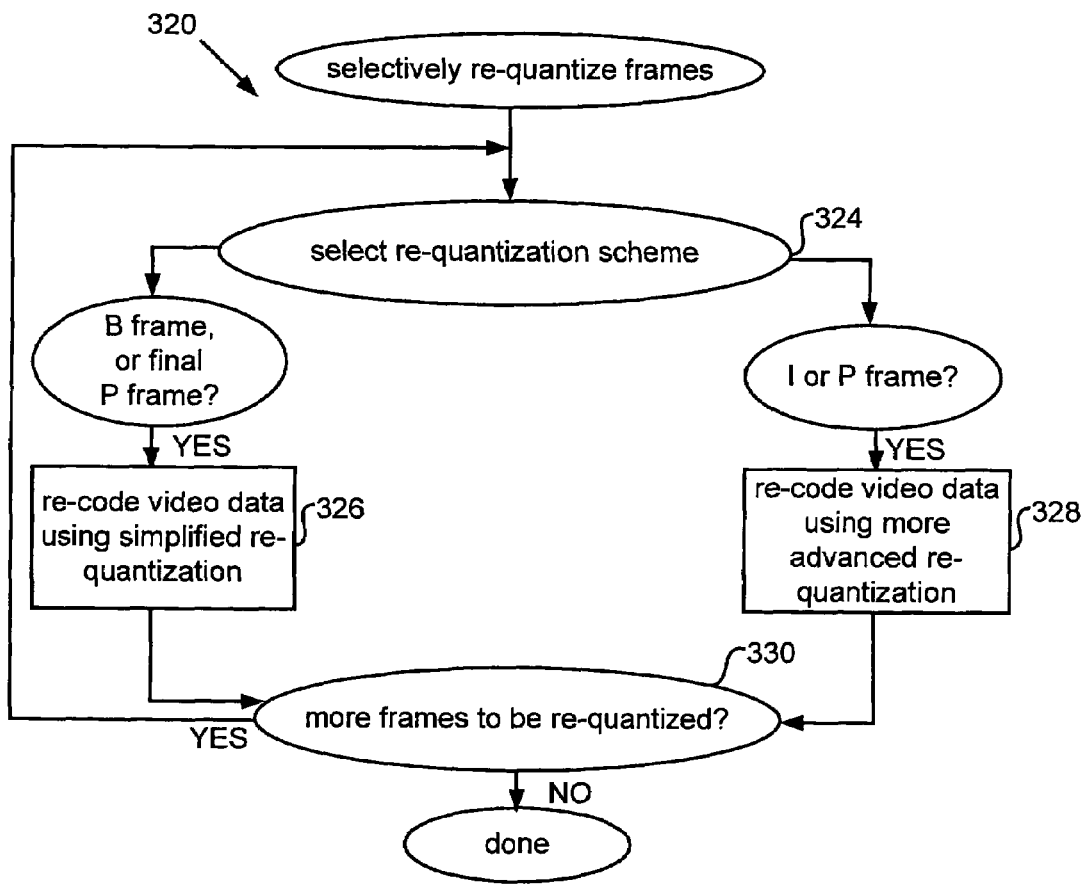
FIG. 5B illustrates a process flow for selective re-quantization of the portion of FIG. 5A in accordance with a specific embodiment of the present invention.

FIG. 5B illustrates a process flow 320 for selective re-quantization of the frame sequence 300 in accordance with a specific embodiment of the present invention. For each frame in the compressed bitstream, the process flow 320 determines which type of re-quantization is to be used (324). The process flow 320 uses two different re-quantization schemes, each having a different computational load.

The process flow 320 selectively re-quantizes B frames 206a-j using a simple re-quantization scheme such as the basic re-quantization scheme 100 of FIG. 4A (326). The basic re-quantization 100 does not impose a large processing load for re-quantizing the B frames 206a-j. The P frames 204a-d are selectively re-quantized based on position of each P frame within its group of picture (GOP). Due to the sensitivity of error propagation, the P frames 204a-c are re-quantized using the re-quantization via motion compensation recoding 120 with motion vector re-use of FIG. 4B (328). The re-quantization via motion compensation recoding 120 of FIG. 4B is more computationally demanding and imposes a large processing load for re-quantizing the video data than the basic re-quantization scheme (328), but introduces less error in the P frames 204a-c that can be subsequently propagated to other frames. Since any re-quantization from the P frame 204d will only propagate into the B frame 206i, the P frame 204d is re-quantized using the basic re-quantization scheme 100 (FIG. 4A). In a more aggressive re-quantization to save computational load, additional P frames are re-quantized using the basic re-quantization scheme 100, e.g. the last two or three P frames in a sequence. The I frame 202 contains no motion vectors and is re-quantized using the basic re-quantization scheme 100 of FIG. 4A (326). A smaller quantization step size may be used in this case to maintain video data quality in the I frame 202. The selection process (324) proceeds for each frame of the compressed bitstream that was received (330). The re-quantized I frame may also be stored in the frame store for the future P and B frames to use as a reference frame.

When desirable, the process flow 320 selectively avoids computationally demanding re-quantization schemes at the remote network devices and headends and may use a less computationally demanding re-quantization scheme. More specifically, the process flow 320 avoids motion compensation recoding for less impacted portions of the bitstream while minimizing the resulting loss in quality for the entire bitstream. Motion compensation of video images and data is typically the most computationally expensive process for encoding. As the B frames may comprise up to 70 percent of many MPEG-2 compressed bitstreams, the selective methods of process flow 320 may result in considerable computational savings. For a transmission system having numerous remote network devices (e.g. hundreds of headends), this results in considerable computational savings for the system. Alternatively, it also reduces the computational load for a single network device having to perform re-quantization for a large number of compressed video bitstreams. This may result in improved computational efficiency at the remote network devices and may increase processing speed of some compressed bitstreams in the range of 30-40 percent (depending on video content).

In another embodiment, the selective re-quantization methods of the present invention consider the type of video data. Human vision is more sensitive to brightness than color. In other words, human vision is less sensitive to the picture quality degradation of chroma (color) information than luma (brightness) information. As a result, the present invention may selectively apply different re-quantization schemes to chroma and luma video data in a compressed video bitstream.

If the amount of bit rate reduction for the compressed bitstream is small, then the basic re-quantization scheme 100 (FIG. 4A) may be used for both chroma and luma compressed data. If the amount of bit rate reduction for the compressed bitstream is significant, a more selective method of re-quantization may be used.

Figure 5C:
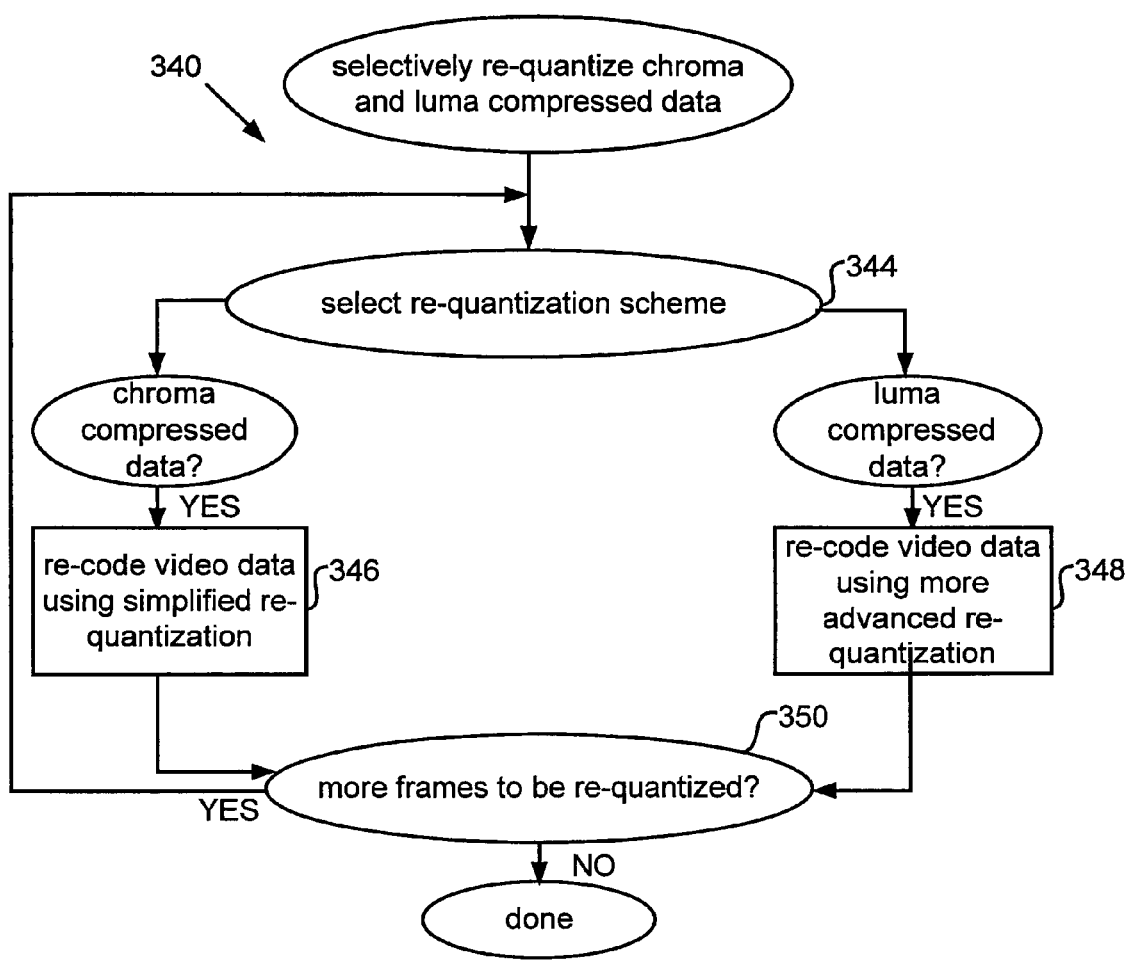
FIG. 5C illustrates a process flow for selective re-quantization of a portion of a compressed video data including color and brightness video data in accordance with a specific embodiment of the present invention.

FIG. 5C illustrates a process flow 340 for selective re-quantization of a frame sequence including compressed chroma and luma video data in accordance with a specific embodiment of the present invention. For each frame in the compressed bitstream, the process flow 320 determines which type of re-quantization is to be used (344). The process flow 340 uses two different re-quantization schemes of different computational load.

The process flow 340 selectively re-quantizes chroma information using a simple re-quantization scheme such as the basic re-quantization scheme 100 of FIG. 4A (346). The basic re-quantization 100 does not impose a large processing load for re-quantizing the chroma information. The luma information is selectively re-quantized using the re-quantization via motion compensation recoding 120 with motion vector re-use of FIG. 4B (348). The re-quantization via motion compensation recoding 120 of FIG. 4B is more computationally demanding and imposes a large processing load for re-quantizing the luma video data than the first re-quantization scheme, but introduces less error in the luma information that may be subsequently detected by human vision. The selection process (344) proceeds for each frame of the compressed bitstream that was received (350).

The selective re-quantization methods of the present invention may combine re-quantization criteria. In a specific embodiment, the process flows 320 and 340 are combined. As one of skill in the art will appreciate, there are numerous ways to combine the process flows 320 and 340. FIG. 5D illustrates a table 360 that illustrates combinations 362 of the process flows 320 and 340 in accordance with one embodiment of the present invention. The combinations 362 are ranked according to computational load of re-quantization. A higher ranking 364 (lower number) refers to computationally more demanding re-quantization and, typically, a higher quality video image. Of course, the ranking may differ based on the content of the compressed bitstream. For example, a high motion black and white film may have much more data in the P and B frames relative to the chroma. In this case, re-quantization of the P and B frames will be more computationally expensive. It is noted that the selection of re-quantization schemes may vary for a single bitstream. For example, combination 1 may be used initially on a compressed bitstream until combination 5 is applied, e.g., when a network device must suddenly process a large number of bitstreams.

In another embodiment, a third re-quantization scheme is used such as complete re-encoding. When a re-quantization scheme including motion compensation is used, the re-quantized I frame is stored in a frame buffer. However, an I frame does not include a motion compensation process by itself since the I frame does not contain motion vectors. The use of a re-quantized I frame is for reconstruction of one or more subsequent P and B frames. Specifically, P and B frames use the stored I frame, along with the coded residual DCT coefficients and motion vectors to form the re-coded P or B frame. The re-quantized I frame is then added to the motion compensated motion residuals. Thus, in this case, a motion compensation operation is applied to I frame, albeit in a different manner than the P and B frames.

Other criteria may be used in determining which re-quantization scheme is used. In a specific embodiment, the present invention monitors the processing load of a CPU in a network device. Based on the CPU cycles, if the processor cannot keep up with a more demanding re-quantization scheme, than the network device applies a more aggressive application of the less computationally demanding re-quantization scheme (e.g., a lower ranking in the table 360). As processor overload may lead to buffer underflow in compressed data transmission, which may then result in data transmission failure, monitoring the CPU in this manner may avoid data transmission failure.

Although the present invention describes bit rate alteration based on selective re-quantization, the present invention may also include bit rate alteration according to one or more additional bit rate alteration techniques. In one embodiment, the present invention relates to bit rate alteration methods that use a combination of bit rate alteration techniques. Several suitable techniques are described in commonly co-pending U.S. patent application entitled "A System and Method for Transporting Compressed Video and Data Bitstream Over a Communication Channel" by Ji Zhang et al., filed on Oct. 10, 1997 (U.S. application Ser. No. 08/947,480), which was previously incorporated by reference. Resolution conversion is a specific bit rate alteration scheme that is suitable for use with the present invention and further described in commonly co-pending U.S. patent application entitled "Methods and Apparatus for Bandwidth Scalable Transmission of Compressed Video Data Through Resolution Conversion" by Ji Zhang et al., filed on Jun. 30, 2000 (U.S. application Ser. No. 09/608, 128), which is incorporated by reference herein for all purposes.

The methods of this present invention may be implemented on various systems. For example, the invention may be implemented on routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. A general architecture for some of these machines will be given below. In an alternative embodiment, the methods of this invention may be implemented on a video streaming server, or a general-purpose network host machine such as a personal computer or workstation. Further, the invention may be at least partially implemented on a card (e.g., an interface card) for a network device or a general-purpose computing device.

Figure 6:
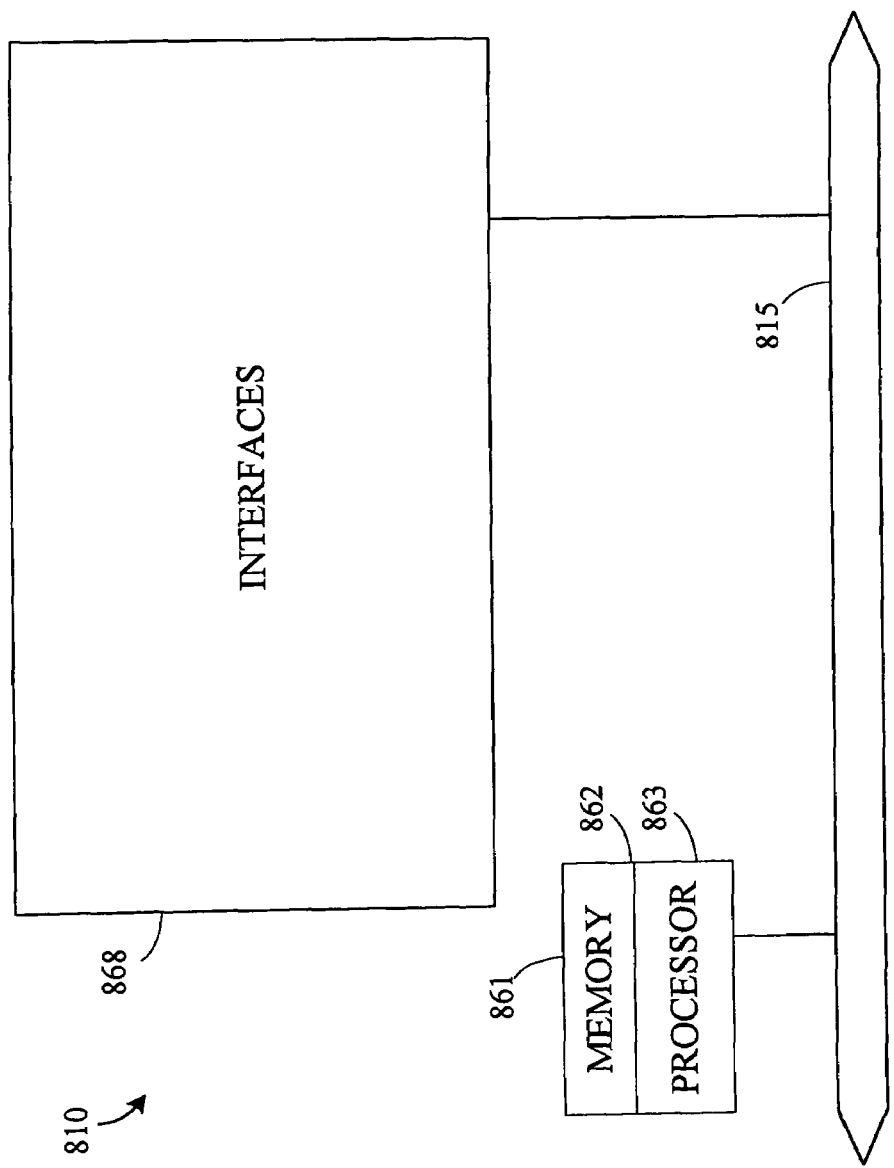
FIG. 6 illustrates a high-level block diagram of an exemplary general-purpose router suitable for implementing the present invention.

Referring now to FIG. 6, a general purpose router 810 suitable for implementing the present invention includes a master central processing unit (CPU) 862, interfaces 868, and a bus 815 (e.g., a PCI bus). When acting under the control of appropriate software or firmware, the CPU 862 is responsible for such router tasks as routing table computations and network management. It preferably accomplishes all these functions under the control of software including an operating system (e.g., the Internetwork Operating System (IOS®) of Cisco Systems, Inc.) and any appropriate applications software. CPU 862 may include one or more processors 863 such as a processor from the Motorola family of microprocessors or the MIPS family of microprocessors. In an alternative embodiment, processor 863 is specially designed hardware for controlling the operations of router 810. In a preferred embodiment, a memory 861 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

In one embodiment, the network device 276 shown in FIG. 2B is implemented as a video bit rate conversion line card. The line card behaves as video network device without any physical interface. In some cases, it may include an appropriate interface for digital video such as ASI and DHEI. The line card may also include multiple on-board video processors for bit rate conversion. While the video processors perform the typical IP routing functions and decide the network loading, these video processors may also change the bit rate for each video channel dynamically, based on the network loading statistics. In another embodiment, a video processing line card includes a physical interface to twisted pair for xDSL output or a physical interface to coaxial cable for QAM or QPSK output. QAM/QPSK format may be converted into satellite or wireless signal, one-way or two-way.

Although the system shown in FIG. 6 is one specific router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration (for cable plants or otherwise), it may employ one or more memories or memory modules (e.g., memory 861) configured to store program instructions for the network operations and other functions of the present invention described herein. The program instructions may specify an operating system and one or more applications, for example. Such memory or memories may also be configured to store data bitstreams, data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

The present invention is suitable for use on a variety of networks. In one embodiment, the present invention suitable toward the integration of bit rate conversion using resolution down conversion with an ADSL rate adaptation feature to achieve relatively lossless transmission. In this case, one element of the invention is to create a synergy between the bit rate conversion of compressed video bitstream and the use of RADSL to transport the compressed video bitstreams.

One particular communication channel that is becoming increasingly common is the cable modem channel, such as that defined by the DOCSIS cable modem standard by Cable-Labs and the DAVIC cable modem standard by DVB. In DOCSIS based cable data networks, operators and digital service providers use the radio frequency spectrum in the coaxial cable network to deliver digital data signal in a 6 MHz frequency slot. The aggregate data bit rate capacity of the slot may be shared by multiple, possibly different, types of information services. Cable modem service is one such information service that allows service operators to provide a number of two-way interactive digital services to subscribers. One particular digital service delivers a compressed digital video signal for video streaming or video on demand. In this case, depending on the overall utilization of the channel capacity, the available bandwidth available to the compressed digital video signal may not be adequate. For example, the compressed digital video signal may require a constant bit rate of 8 Mbps, but the available bandwidth is only 6 Mbps, or even 500 Kbps. In some cases, service operators may deliberately limit the available bandwidth for certain video data based on a subscriber's level of premium service. For example, a popular movie title may require a per title premium charge to the subscriber, but a lower bit rate (thus lower quality) video of the same video content may be available for free to all subscribers. Thus, it is important for service providers in this case to handle compressed video data at multiple bit rates.

Yet another particular communication channel that is becoming increasingly common is IP networks and Asynchronous Transfer Mode (ATM) networks. Both networks are based on different transport protocols that can be used to transport data or multimedia bitstreams with a pre-specified quality of service. For example, ATM protocol specifies how data is first packetized into fixed sized data units, called cells. It also specifies how such a cell stream can be multiplexed, de-multiplexed, switched and routed between different locations to support end-to-end connections at given bit rate and/or quality of service (QOS). The present invention also includes the concept of traffic shaping, used on ATM networks to change the bit rate profile of ATM cell bitstreams through the bit rate conversion of compressed video data. In ATM networks, connections may be established with predetermined grade of QOS. Conditions of network utilization, along with call admission control, sometimes may prevent a new connection being established at the given bit rate or given quality of service. In such cases, the requested connection may either have to be rejected or a new set of admissible connection parameters have to be negotiated between the network service provider and the user requesting the connection.

In another communication channel example, integrated services (IntServ), differential services (DiffServ), and Multiple Protocol Label Switch (MPLS) are used to establish a QOS for different network traffic. These services may use the Common Open Policy Service (COPS) for admission control. Internet Group Management Protocol (IGMP) and a variety of multicast routing protocols are also used to establish and tear down service on a multicast tree, which is commonly used for video transmission. In all these cases, the requested connection must provide the available bandwidth for the data being sent or the requested connection may either have to be rejected or a new set of admissible connection parameters may have to be negotiated.

While this invention has been described in terms of several preferred embodiments, there are alterations, permutations, and equivalents which fall within the scope of this invention which have been omitted for brevity's sake. For example, the present invention may be used to perform bandwidth sharing, despite the fact that the available bandwidth from the transmission facility, which includes but is not limited to, xDSL, ATM, wireless channel, is sufficient to send the incoming compressed bitstream. In general, for data traffic, such as TCP/IP based traffic, the data bit rate cannot be determined. In addition, the video bitstream may not have constant bit rate, therefore, the resulting total bandwidth cannot be determined before the connection is established. The application of bit rate conversion through re-quantization, however, will ensure that the resulting total bandwidth will always be less than the total available channel bandwidth. It is therefore intended that the scope of the invention should be determined with reference to the appended claims.

What is claimed is:

1. A method for converting the bit rate of a compressed bitstream to use an available bandwidth of a channel, the method comprising:
    re-quantizing a first portion of the bitstream that includes a B frame including video data using a first re-quantization scheme that does not decode the first portion into a pixel domain; and
    re-quantizing a second portion of the bitstream that includes a P frame including video data or an I frame including video data using a second re-quantization scheme that includes full decoding and re-encoding of the second portion.

2. The method of claim 1 wherein the first re-quantization scheme includes basic re-quantization.

3. The method of claim 1 wherein the compressed bitstream is an MPEG compressed bitstream.

4. The method of claim 1 further including determining the available bandwidth of the channel.

5. The method of claim 1 wherein the second re-quantization scheme creates a new motion vector for the second portion of the bitstream.

6. The method of claim 1 further including changing the resolution of the second portion.

7. The method of claim 1 wherein the first and second portion each include a frame of the video data.

8. The method of claim 1 wherein the first portion includes a P frame and the P frame is the last P frame in a group of pictures.

9. The method of claim 1 wherein the first portion comprises color video data.

10. The method of claim 1 wherein the second portion comprises brightness video data.

11. The method of claim 1 wherein the first and second re-quantization schemes are performed in real time.

12. The method of claim 1 further including monitoring the processing load of a processor in a network device.

13. The method of claim 1 wherein the second re-quantization scheme re-uses a motion vector for the second portion of the bitstream.

14. A system for converting the bit rate of a compressed bitstream to use an available bandwidth of a channel, the system comprising:
    means for re-quantizing a first portion of the bitstream that includes a B frame including video data using a first re-quantization scheme that does not decode the first portion into a pixel domain; and
    means for re-quantizing a second portion of the bitstream that includes a P frame including video data or an I frame including video data using a second re-quantization scheme that includes full decoding and re-encoding of the second portion.

15. The system of claim 14 wherein the means for re-quantizing the first portion is included in the means for re-quantizing the second portion.

16. The system of claim 14 wherein the means for re-quantizing the first portion includes means for performing basic re-quantization.

17. The system of claim 14 wherein the means for re-quantizing the second portion includes means for performing motion compensated re-quantization.

18. A computer readable medium encoded with computer executable instructions for converting the bit rate of a compressed bitstream to use an available bandwidth of a channel, the computer executable instructions comprising:
    instructions for re-quantizing a first portion of the bitstream that includes a B frame including video data using a first re-quantization scheme that does not decode the first portion into a pixel domain; and
    instructions for re-quantizing a second portion of the bitstream that includes a P frame including video data or an I frame including video data using a second re-quantization scheme that includes full decoding and re-encoding of the second portion.

19. An apparatus for converting the bit rate of a compressed bitstream, the apparatus comprising:
    memory,
    a processor coupled to memory, the processor configured to re-quantize a first portion of the bitstream that includes a B frame including video data using a first re-quantization scheme that does not decode the first portion into a pixel domain and re-quantize a second portion of the bitstream that includes a P frame including video data or an I frame including video data using a second re-quantization scheme that includes full decoding and re-encoding of the second portion.

* * * * *